US009002715B2

(12) United States Patent
Seto et al.

(10) Patent No.: US 9,002,715 B2
(45) Date of Patent: Apr. 7, 2015

(54) INFORMATION PROCESSOR

(75) Inventors: Yusuke Seto, Tokyo (JP); Tadashi Suzuki, Tokyo (JP); Ryo Iwamiya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 322 days.

(21) Appl. No.: 13/698,451

(22) PCT Filed: Aug. 9, 2010

(86) PCT No.: PCT/JP2010/004996
§ 371 (c)(1),
(2), (4) Date: Nov. 16, 2012

(87) PCT Pub. No.: WO2012/020444
PCT Pub. Date: Feb. 16, 2012

(65) Prior Publication Data
US 2013/0066637 A1    Mar. 14, 2013

(51) Int. Cl.
*G10L 21/00* (2013.01)
*G06F 3/16* (2006.01)
*G10L 15/22* (2006.01)

(52) U.S. Cl.
CPC .............. *G06F 3/167* (2013.01); *G10L 15/22* (2013.01); *G10L 2015/228* (2013.01)

(58) Field of Classification Search
USPC ............... 704/7, 275, 270, 270.1, 2; 709/206, 709/224; 455/557; 382/224; 379/88.22, 379/210.01; 178/18.04; 705/26.1
See application file for complete search history.

(56) References Cited

U.S. PATENT DOCUMENTS 5,606,498 A * 2/1997 Maruta et al. ................ 704/7
5,875,421 A * 2/1999 Takeuchi ...................... 704/2
(Continued)

FOREIGN PATENT DOCUMENTS

EP     1 895 508 A1    3/2008
JP     2004-212533 A   7/2004
(Continued)

*Primary Examiner* — Michael Colucci
(74) *Attorney, Agent, or Firm* — Birch, Stewart, Kolasch & Birch, LLP

(57) ABSTRACT

Information processor 1 includes display unit 30 for displaying an interface screen having function execution key unit 23 indicating a prescribed function for each function type, and interface screen change key unit 22 for switching each function type; interface screen control unit 20 for controlling display switching of the screen on the display unit 30 in response to an input operation signal; interface screen operation history recording unit 110 for recording, as continuous operation information, operation time and operation contents of the function execution key unit 23 or interface screen change key unit 22 in response to the input operation signal; likelihood value providing unit 120 for calculating and adding, to each function the function execution key unit 23 indicates, a likelihood value indicating a degree of a user desire from the continuous operation information recorded; priority recognition word setting unit 130 for outputting word information corresponding to the function whose likelihood value is not less than a prescribed value; voice recognition unit 60 for recognizing input voice by referring to the word information; and function executing unit 70 for executing the function of the function execution key unit 23 operated via interface screen operating unit 40 or the function corresponding to the word passing through the voice recognition by the voice recognition unit 60.

10 Claims, 10 Drawing Sheets

(56) References Cited

U.S. PATENT DOCUMENTS

| | | | |
|---|---|---|---|
| 6,111,940 A * | 8/2000 | Kugell | 379/210.01 |
| 6,404,925 B1 * | 6/2002 | Foote et al. | 382/224 |
| 7,881,750 B2 * | 2/2011 | Suonpera et al. | 455/557 |
| 8,311,835 B2 * | 11/2012 | Lecoeuche | 704/270.1 |
| 8,676,904 B2 * | 3/2014 | Lindahl | 709/206 |
| 2002/0035474 A1 * | 3/2002 | Alpdemir | 704/270 |
| 2003/0191648 A1 * | 10/2003 | Knott et al. | 704/275 |
| 2006/0143093 A1 * | 6/2006 | Brandt et al. | 705/26 |
| 2009/0166098 A1 * | 7/2009 | Sunder | 178/18.04 |
| 2009/0248419 A1 * | 10/2009 | Spaulding et al. | 704/275 |
| 2010/0131642 A1 * | 5/2010 | Chalikouras et al. | 709/224 |
| 2010/0220843 A1 * | 9/2010 | Bosan et al. | 379/88.22 |

FOREIGN PATENT DOCUMENTS

| | | |
|---|---|---|
| JP | 2005-181386 A | 7/2005 |
| WO | WO 2006/137245 A1 | 12/2006 |

* cited by examiner

FIG.5

| Function Execution Key | Corresponding Function Information | Display Duration (sec) | Likelihood Value (Display Duration × -1) |
|---|---|---|---|
| $FK_B$ | B | 0 | 0 |
| $FK_A$ | A | 5.5 | -5.5 |
| $FK_D$ | D | 11.2 | -11.2 |
| $FK_E$ | E | 15.7 | -15.7 |
| $FK_C$ | C | 25.4 | -25.4 |

INFORMATION PROCESSOR

TECHNICAL FIELD

The present invention relates to an information processor that selects and executes functions according to operation input and voice input of a user, for example.

BACKGROUND ART

Conventional information processors are configured in such a manner as to execute functions by displaying executable functions as numbers of function execution keys and by starting a program corresponding to the function execution key a user selects. Such an information processor displays function execution keys hierarchically in accordance with functions, and it is sometime difficult for a user to find a desired function execution key by only his or her operation input. In view of this, a configuration is disclosed which facilitates selection of a function execution key by voice recognition. For example, according to Patent Document 1, an information processor is configured in such a manner as to decide a word to be subjected to voice recognition preferentially according to the number of times of operations of a function execution key, and to carry out voice recognition by giving priority to a word corresponding to a function of a function execution key not displayed at present or to a function of a function execution key that are remote from the present operation position.

PRIOR ART DOCUMENT

Patent Document

Patent Document 1: WO2006/137245

DISCLOSURE OF THE INVENTION

However, the information processor of the Patent Document 1 described above does not carry out preferential voice recognition of the word corresponding the function the user desires, which offers a problem of executing another function prior to the function the user desires.

The present invention is implemented to solve the foregoing problem. Therefore it is an object of the present invention to provide an information processor capable of facilitating the function the user desires by voice recognition.

An information processor in accordance with the present invention comprises: a display unit for displaying an interface screen having a function execution key unit indicating a prescribed function for each function type, and an interface screen change key unit for switching the interface screen for the each function type; an interface screen operating unit for accepting an operation for the function execution key unit or for the interface screen change key unit displayed on the display unit; an interface screen control unit for receiving an operation signal corresponding to an operation made from the interface screen operating unit to the interface screen change key unit, and for controlling display switching of the interface screen on the display unit in response to the operation signal; an interface screen operation history recording unit for recording, in response to the operation signal which corresponds to the operation of the function execution key unit or of the interface screen change key unit and which is received from the interface screen operating unit, operation time of the function execution key unit or of the interface screen change key unit and operation contents resulting from continuous operations of the interface screen change key unit at intervals not greater than the prescribed time period as continuous operation information; a likelihood value providing unit for calculating and adding, to each function the function execution key unit indicates, a likelihood value indicating a degree of a desire of a user in accordance with the continuous operation information recorded in the interface screen operation history recording unit; a priority recognition word setting unit for storing word information for each function in advance, and for outputting the word information corresponding to the function whose likelihood value which is set by the likelihood value providing unit is not less than a prescribed value; a voice recognition unit for carrying out voice recognition of an input voice by referring to the word information supplied from the priority recognition word setting unit; and a function executing unit for executing the function of the function execution key unit operated via the interface screen operating unit or the function corresponding to the word which passes through the voice recognition by the voice recognition unit.

According to the present invention, it can facilitate executing the function the user desires by the voice recognition.

BRIEF DESCRIPTION OF THE DRAWINGS

FIG. 5 is a diagram showing an example of display duration and likelihood values of the function execution key units of the information processor of the embodiment 1 in accordance with the present invention;

EMBODIMENTS FOR CARRYING OUT THE INVENTION

The best mode for carrying out the invention will now be described with reference to the accompanying drawings to explain the present invention in more detail.

Embodiment 1

Figure 1:
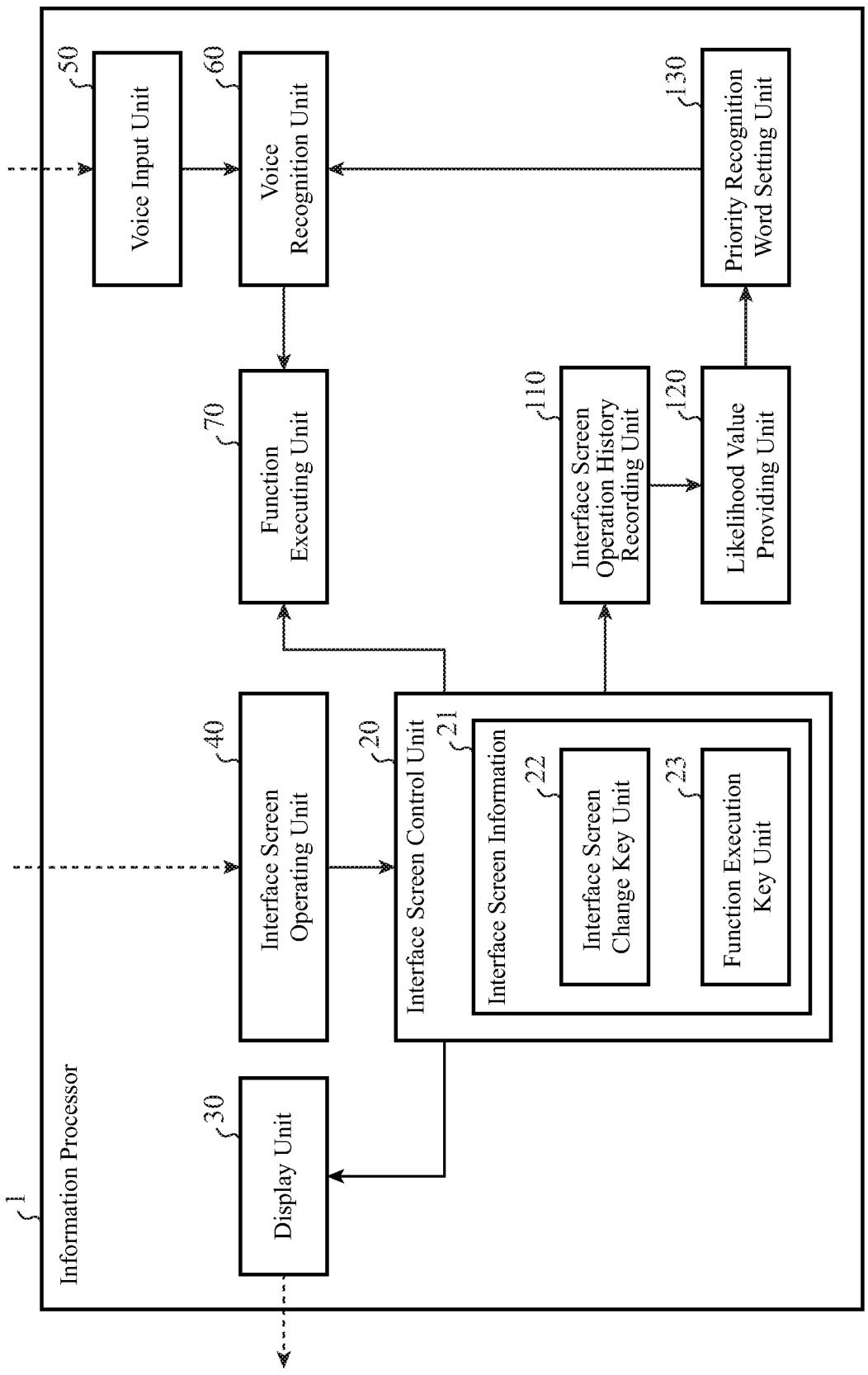
FIG. 1 is a block diagram showing a functional configuration of an information processor of the embodiment 1 in accordance with the present invention.

FIG. 1 shows a functional configuration of an information processor of an embodiment 1. As shown in FIG. 1, the information processor 1 comprises an interface screen control unit 20, a display unit 30, an interface screen operating unit 40, a voice input unit 50, a voice recognition unit 60, a function executing unit 70, an interface screen operation history recording unit 110, a likelihood value providing unit 120, and a priority recognition word setting unit 130.

The interface screen control unit 20 stores plural pieces of preset interface screen information 21, and is configured in such a manner as to display the contents and information of the interface screen information 21 via the display unit 30 as an interface screen. The interface screen information 21 includes plural interface screen change key units 22 and plural function execution key units 23. The plural function execution key units 23 show prescribed functions, respectively, and the plural interface screen change key units 22 show a kind (type) of the functions, respectively. The plural function execution key units 23 are classified and arranged in a hierarchical order under the interface screen change key unit 22 in accordance with a kind of the functions.

In addition, the interface screen control unit 20 is configured in such a manner as to acquire from the interface screen operating unit 40 an operation signal corresponding to the operation of the interface screen change key unit 22 on the display unit 30, as to control display switching of the interface screen (function execution key units 23 corresponding to the interface screen change key unit 22) on the display unit 30 in response to the operation signal corresponding to the interface screen change key unit 22, and as to output a command signal from the interface screen operating unit 40 to the function executing unit 70.

Receiving an instruction to display a function menu from a user via the interface screen operating unit 40, for example, the interface screen control unit 20 outputs the highest hierarchical interface screen information 21. Subsequently, the interface screen control unit 20 supplies the plural function execution key units 23 corresponding to the interface screen change key unit 22 selected by the user to the display unit 30 as an interface screen. In addition, receiving a command signal via the interface screen operating unit 40, for example, the interface screen control unit 20 supplies the received command signal to the function executing unit 70, thereby commanding it to execute the function.

Furthermore, the interface screen control unit 20 is configured in such a manner as to output operation content information and operation time information (operation information) to the interface screen operation history recording unit 110 in response to the operation signal from the interface screen operating unit 40. Receiving the operation signal for the interface screen change key unit 22 or the operation signal for the function execution key unit 23 from the user via the interface screen operating unit 40, for example, the interface screen control unit 20 supplies the operation content information indicating the operated interface screen change key unit 22 or the operated function execution key unit 23 and the operation time information indicating the operation timing to the interface screen operation history recording unit 110 as the operation information.

The display unit 30, which consists of a monitor, for example, has a function of displaying the interface screen including the function execution key units 23 and interface screen change key units 22 fed from the interface screen control unit 20. The interface screen displays for each function type the function execution key units 23 indicating a prescribed function, and is switched for each function type in response to the interface screen change key unit 22 selected by the user.

The interface screen operating unit 40 receives the user operation corresponding to the interface screen displayed on the display unit 30, and supplies, in response to the operation signal of the function execution key unit 23 on the interface screen, the command signal for executing the function corresponding to the function execution key unit 23 to the function executing unit 70 via the interface screen control unit 20. The interface screen operating unit 40 consists of a touch screen, remote control, and control pad, for example.

The voice input unit 50, which consists of a microphone, for example, has a function to input voice from the user as voice information.

The voice recognition unit 60 is configured in such a manner as to carry out, according to the voice information from the voice input unit 50 and the word information from the priority recognition word setting unit 130, the voice recognition of the input voice information by referring to the word information. The voice recognition unit 60, receiving a signal for starting the voice recognition from the user, for example, acquires the voice information from the voice input unit 50 and the word information from the priority recognition word setting unit 130, decides the function corresponding the word recognized from the voice information by referring to the word information, and supplies the function executing unit 70 with the command signal for executing the function decided.

The function executing unit 70 is configured in such a manner as to execute the function of the function execution key unit 23 operated using the interface screen operating unit 20, or the function corresponding to the word passing through the voice recognition by the voice recognition unit 60. The function executing unit 70, receiving the command signal including the function information of the function execution key unit 23 operated using the interface screen control unit 20, or the command signal including the function information corresponding to the word recognized by the voice recognition unit 60, for example, starts the program corresponding to the function information from among pre-stored plural programs in accordance with the function information included in the command signal and executes the program.

The interface screen operation history recording unit 110 records as continuous operation information the operation time of the function execution key units 23 and interface screen change key units 22 and the contents of continuous operations of the interface screen change key units 22 at intervals not greater than a prescribed time period in response to the operation signal which corresponds to the operations of the function execution key units 23 and interface screen change key units 22 and which is supplied from the interface screen operating unit 20. The interface screen operation history recording unit 110 includes past continuous operation information indicating the contents of the continuous operations of the interface screen change key unit 22 until the function execution key unit 23 is operated, and the current continuous operation information indicating the contents of the continuous operations of the interface screen change key unit 22 without any operation of the function execution key unit 23 up to now.

In addition, the interface screen operation history recording unit 110 functions in such a manner as to supply the continuous operation information it records to the likelihood value providing unit 120. Incidentally, the interface screen operation history recording unit 110 records the operation information and continuous operation information from the shipment up to the present or from the time of starting the processor up to now.

The interface screen operation history recording unit 110 records, when the operation information is about the content of operating the function execution key unit 23, the contents of the continuous operations of the interface screen change key units 22 and the operation time of each step of the operations, which are carried out at intervals not greater than the prescribed time period until the function execution key unit 23 is operated, as the past continuous operation information in accordance with the operation information supplied from the interface screen control unit 20, for example. Thus, the past continuous operation information indicates the continuous operations when a function is executed, but does not include continuous operations before any function is executed. Incidentally, when a function is executed in response to the voice recognition, it is also recorded as the past continuous operation information.

When the operation content is about an operation of other than the function execution key unit 23, the interface screen operation history recording unit 110 updates and adds the continuous operation contents executed at intervals not greater than the prescribed time period and their operation time, records them as the current continuous operation information, and outputs the current continuous operation information to the likelihood value providing unit 120. Outputting the current continuous operation information, the interface screen operation history recording unit 110 successively outputs the past continuous operation information to the likelihood value providing unit 120. It is assumed in the following description that the term "continuous operation information" simply mentioned includes both the current continuous operation information and past continuous operation information.

Incidentally, when the interface screen operation history recording unit 110 executes the function in a single step, it stores only the operation content of the function executed and its operation time as the past continuous operation information.

The likelihood value providing unit 120 is configured in such a manner as to determine the display duration of the function execution key unit 23 (time period from the start of displaying the function execution key unit 23 to the end of the display) from the continuous operation information recorded in the interface screen operation history recording unit 110, and to calculate and provide a likelihood value, which indicates a probability (degree) that the function is one a user wants to execute at present, in a manner that for each function the function execution key unit 23 represents, the shorter the display duration, the higher the desired degree.

According to the current continuous operation information recorded in the interface screen operation history recording unit 110, for example, the likelihood value providing unit 120 decides that when the interval between the present time and the last operation time included in the current continuous operation information is not greater than a prescribed time period, the present operation belongs to the latest continuous operation. When the likelihood value providing unit 120 decides that the present operation belongs to the latest continuous operation, it calculates from the current continuous operation information the display duration for each function execution key unit 23 displayed on the display unit 30. The likelihood value providing unit 120 calculates and determines for each function the likelihood value corresponding to the display duration of the function execution key unit 23 from each display duration. The likelihood value providing unit 120 provides the function information with the likelihood value and outputs it.

Incidentally, the likelihood value providing unit 120 can be configured in such a manner as to calculate the likelihood value from the current continuous operation information and past continuous operation information. In this case, the likelihood value providing unit 120 calculates the likelihood value by comparing the current continuous operation information with the past continuous operation information or by selecting from among the past continuous operation information. For example, the likelihood value providing unit 120 calculates the degree of agreement by comparing the past continuous operation information indicating the contents of the continuous operations of the interface screen change key unit 22 until the function execution key unit 23 is operated, which is recorded in the interface screen operation history recording unit 110, with the current continuous operation information indicating the contents of the continuous operations of the interface screen change key unit 22 executed up to the present without any operation of the function execution key unit 23, and estimates, when the function execution key unit 23 is operated in the present operation, the degree of agreement as the likelihood value to be provided to the current function which corresponds to the function executed in the past continuous operation information.

The priority recognition word setting unit 130 is configured in such a manner as to store the word information for each function in advance, and to output the word information corresponding to the function whose likelihood value set by the likelihood value providing unit 120 is not less than a prescribed value. According to the likelihood value provided to the function information from the likelihood value providing unit 120, for example, the priority recognition word setting unit 130 supplies the voice recognition unit 60 with the word information corresponding to the function information whose likelihood value is not less than the prescribed value so that the voice recognition unit 60 carries out the voice recognition preferentially by increasing variations of the word to be recognized. For example, to increase variations of a word "two-window display" corresponding to the function of displaying maps in two windows on a screen, the priority recognition word setting unit 130 adds interchangeable words such as "two-window maps" and "screen division" to the word to be recognized.

Next, an example of an interface screen displayed on the display unit 30 of the information processor 1 will be described with reference to FIG. 2.

Figure 2:
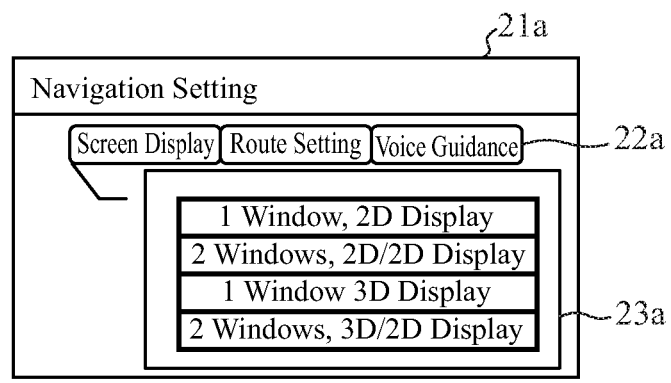
FIG. 2 is a diagram showing an example of an interface screen displayed on the information processor of the embodiment 1 in accordance with the present invention.

As shown in the interface screen 21a of FIG. 2, the display unit 30 displays a plurality of interface screen change key units 22a and function execution key units 23. When a user selects an interface screen change key unit 22a, the plurality of function execution key units 23a corresponding to the type of the interface screen change key unit 22a selected are displayed. In FIG. 2, the interface screen 21a shows a "navigation setting" screen, in which "screen display" is selected as the interface screen change key unit 22a. In addition, as the function execution key units 23a of the "screen display" are displayed "single-window, 2D display", "two-window, 2D/2D display", "single-window, 3D display", and "two-window, 3D/2D display". From the plurality of the function execution key units 23a, the user selects one of them so that the function corresponding to the selected function execution key unit 23a is executed.

Figure 3:
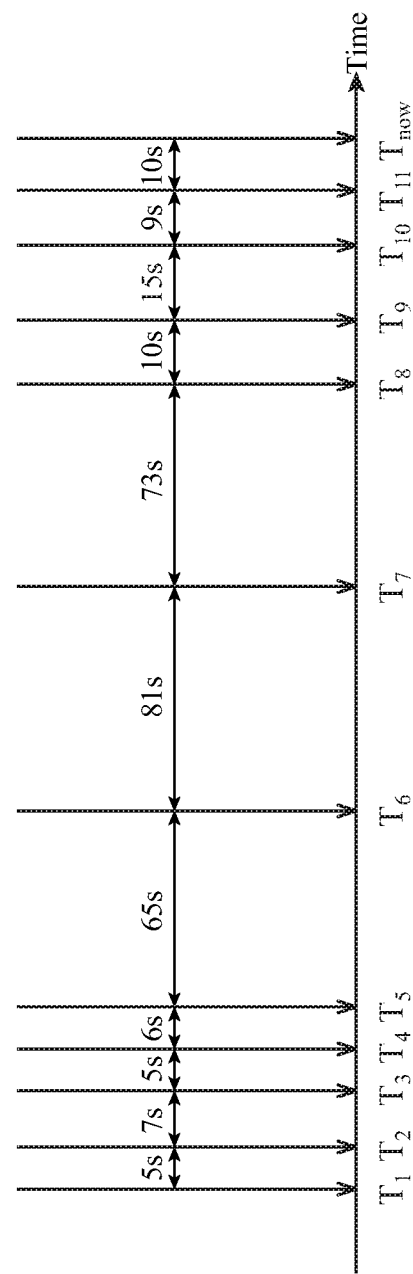
FIG. 3 is a diagram showing operation time in the information processor of the embodiment 1 in accordance with the present invention.

Next, continuous operation in the information processor 1 will be described. FIG. 3 shows operation time in the information processor 1, in which the horizontal axis represents a time axis.

Figure 4:
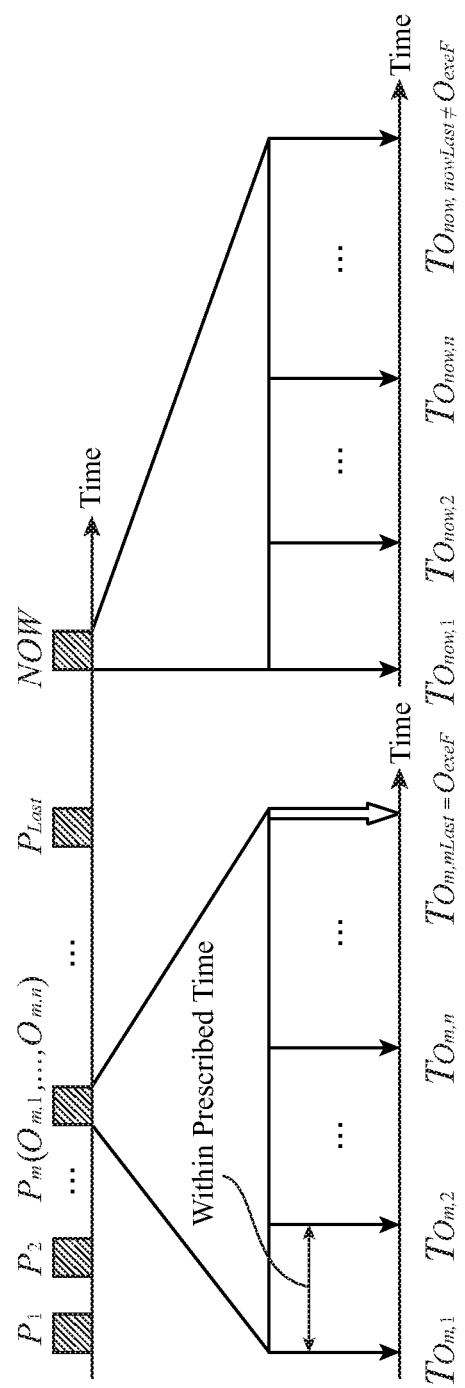
FIG. 4 is a diagram showing continuous operations in the information processor of the embodiment 1 in accordance with the present invention.

FIG. 4 shows the continuous operation in the information processor 1.

In FIG. 3, operation times $T_1$, $T_2$, $T_3$, $T_4$, $T_5$, $T_6$, $T_7$, $T_8$, $T_9$, $T_{10}$, $T_{11}$ and $T_{now}$ show timing at which the interface screen undergoes operation. Intervals between operation times are as follows; operation time $T_1$ to $T_2$ is 5 s (seconds); operation time $T_2$ to $T_3$ 7 seconds; operation time $T_3$ to $T_4$ 5 seconds; operation time $T_4$ to $T_5$ 6 seconds; operation time $T_5$ to $T_6$ 65 seconds; operation time $T_6$ to $T_7$ 81 seconds; operation time $T_7$ to $T_8$ 73 seconds; operation time $T_8$ to $T_9$ 10 seconds; operation time $T_9$ to $T_{10}$ 15 seconds; operation time $T_{10}$ to $T_{11}$ 9 seconds; operation time $T_{11}$ to $T_{now}$ 10 seconds.

Here, when the user carries on an operation continuously within a prescribed time period, it can be considered that the user is searching for the function execution key unit 23 with a desired function. Accordingly, when the prescribed time period is set at 30 seconds, for example, the interface screen operation history recording unit 110 decides that the successive operations within the interval of the prescribed time period 30 seconds are continuous operation, and stores the operation time $T_1$ to $T_5$ and its operation contents, and the operation time $T_8$ to $T_{now}$ and its operation contents as a continuous operation (continuous operation information) $P_m$ as shown in FIG. 4.

The interface screen operation history recording unit 110 records from the past to the latest continuous operation information $P_1, P_2, \ldots, P_m$ ($T_{Om, 1}, T_{Om, 2}, \ldots, T_{Om, n}, \ldots, T_{Om, mLast=OexeF}$), $\ldots, P_{Last}$ as shown in FIG. 4. In addition, during the continuous operation in which the operation information is being input at intervals within the prescribed time period and unless the function execution key unit 23 is selected up to the present time in the continuous operation as shown in FIG. 4, the interface screen operation history recording unit 110 records as the current continuous operation information NOW ($T_{Onow, 1}, T_{Onow, 2}, \ldots, T_{Onow, n}, \ldots, T_{Onow, nowLast\ne Oexef}$).

Next, the likelihood value in the embodiment 1 will be described. FIG. 5 shows the display duration and likelihood value of the function execution key unit in the information processor.

According to the individual operation contents and operation time contained in the current continuous operation information fed from the interface screen operation history recording unit 110, the likelihood value providing unit 120 calculates the display duration 153 and likelihood value 154 for each function information 152 corresponding to a function execution key unit 151 as shown in FIG. 5. In FIG. 5, the display duration 153 of the function information 152 "B" corresponding to the function execution key unit 151 "$FK_B$" is "0 (sec)", the display duration 153 of the function information 152 "A" corresponding to the function execution key unit 151 "$FK_A$" is "5.5 (sec)", the display duration 153 of the function information 152 "D" corresponding to the function execution key unit 151 "$FK_D$" is "11.2 (sec)", the display duration 153 of the function information 152 "E" corresponding to the function execution key unit 151 "$FK_E$" is "15.7 (sec)", and the display duration 153 of the function information 152 "C" corresponding to the function execution key unit 151 "$FK_C$" is "25.4 (sec)".

The likelihood value providing unit 120 calculates the likelihood value 154 by multiplying the display duration 153 by −1 (minus one). As shown in FIG. 5, the likelihood value 154 of the function information 152 "B" corresponding to the function execution key unit 151 "$FK_B$" is "0", the likelihood value 154 of the function information 152 "A" corresponding to the function execution key unit 151 "$FK_A$" is "−5.5", the likelihood value 154 of the function information 152 "D" corresponding to the function execution key unit 151 "$FK_D$" is "−11.2", the likelihood value 154 of the function information 152 "E" corresponding to the function execution key unit 151 "$FK_E$" is "−15.7", and the likelihood value 154 of the function information 152 "C" corresponding to the function execution key unit 151 "$FK_C$" is "−25.4". The likelihood value providing unit 120 calculates the likelihood values 154 in such a manner as to make the functions B>A>D>E>C, thereby setting the likelihood value 154 of a function of a function execution key unit 23 so that a function the user views shorter has a higher value. The likelihood value providing unit 120 provides each function information 152 with the likelihood value 154 and supplies it to the priority recognition word setting unit 130. Using the likelihood value 154, the priority recognition word setting unit 130 sets in such a manner that the word corresponding to a function other than the functions of the function execution key unit 23, which have already been displayed, undergoes the voice recognition preferentially.

Incidentally, the calculation method of the likelihood value 154 described above is an example, and any method is possible as long as it sets the likelihood value 154 so as to take a value inversely proportional to the display duration for each key of the function execution key unit 23. For example, the likelihood value providing unit 120 can be configured in such a manner as to calculate the likelihood value as a value obtained by subtracting a value corresponding to the display duration of each function from a preset value. Such a configuration offers an advantage of being able to carry out the voice recognition while giving priority to the word corresponding to the function of the function execution key unit 23 with shorter display duration.

Next, the processing operation of the information processor 1 of the embodiment 1 will be described with reference to the flowchart of FIG. 6.

Figure 6:
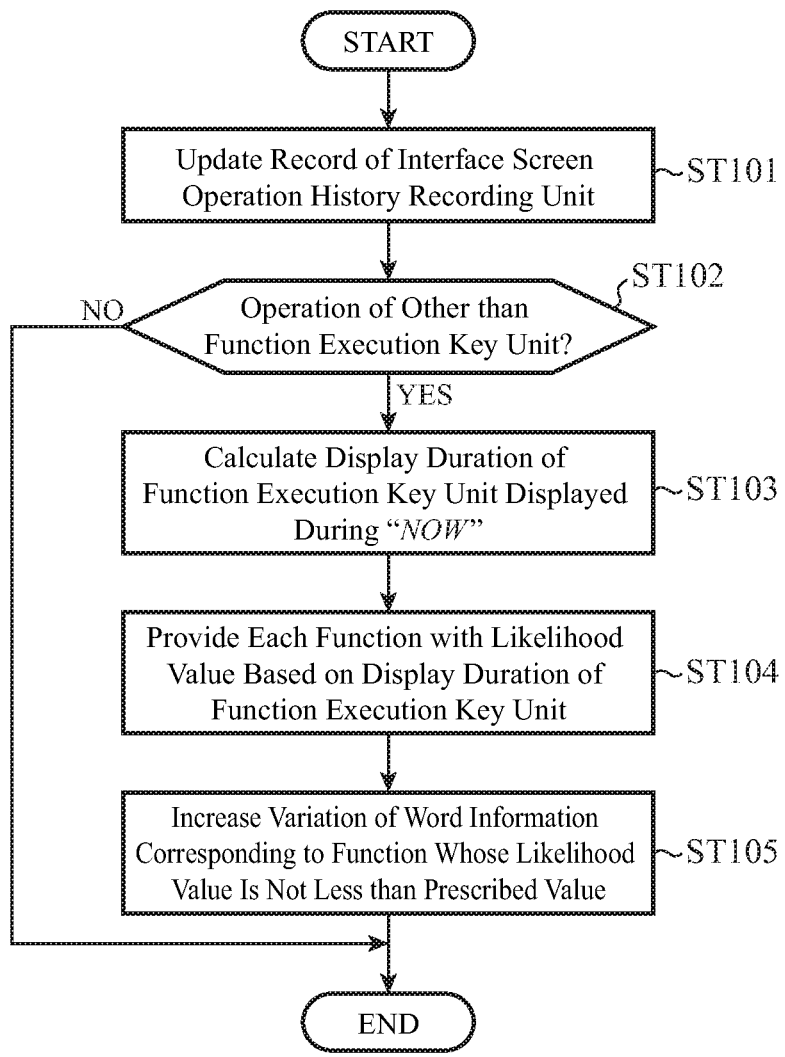
FIG. 6 is a flowchart showing the processing operation of the information processor of the embodiment 1 in accordance with the present invention.

When a user operates the interface screen via the interface screen operating unit 40, the information processor 1 starts its processing ("START" of FIG. 6).

When the user operates the interface screen change key unit 22 or function execution key unit 23 via the interface screen operating unit 40, the interface screen control unit 20 supplies the interface screen operation history recording unit 110 with the operation content indicating the interface screen change key unit 22 or function execution key unit 23 operated and the operation time indicating the timing of the operation.

According to the operation information supplied from the interface screen control unit 20, the interface screen operation history recording unit 110 adds or updates the operation contents and their operation time carried out continuously at intervals not greater than the prescribed time period until the function execution key unit 23 is operated, thereby recording as the current continuous operation information (step ST101).

Simultaneously with the processing at step ST101, the interface screen operation history recording unit 110 decides on whether the operation content of the operation information supplied is an operation of the function execution key unit 23 or an operation of other than the function execution key unit 23 (step ST102).

When the interface screen operation history recording unit 110 decides at step ST102 that it is the operation of the function execution key unit 23 ("NO" at step ST102), it records the operation contents and their operation time carried out continuously at intervals not greater than the prescribed time period until the operation of the function execution key unit 23 as the past continuous operation information, and terminates the processing until the next operation information is input ("END").

On the other hand, when the interface screen operation history recording unit 110 decides that it is the operation of other than the function execution key unit 23 at step ST102 ("YES" at step ST102), it updates or adds the operation contents and their operation time carried out continuously at intervals not greater than the prescribed time period, records them as the current continuous operation information NOW, and supplies the current continuous operation information NOW to the likelihood value providing unit 120.

According to the current continuous operation information NOW, the likelihood value providing unit 120 calculates the display duration for each function execution key unit 23 displayed via the display unit 30 during the continuous operation period of the continuous operation information NOW (step ST103).

After calculating the display duration for each function execution key unit 23 at step ST103, the likelihood value providing unit 120 calculates and determines the likelihood value for each function from each display duration. The likelihood value providing unit 120 provides each function information with the likelihood value determined, and supplies to the priority recognition word setting unit 130 (step ST104).

Receiving each function information provided with the likelihood value from the likelihood value providing unit 120, the priority recognition word setting unit 130 decides on whether the likelihood value is not less than the prescribed value or not from the likelihood value provided to the function information. The priority recognition word setting unit 130 sets to the voice recognition unit 60 the word information corresponding to the function information provided with the likelihood value not less than the prescribed value to increase variations of voice recognizable word (step ST105).

According to the word information fed from the priority recognition word setting unit 130 and the voice information fed from the voice input unit 50, the voice recognition unit 60 recognizes the word information corresponding to the voice information, and commands the function executing unit 70 to execute the function by supplying it with the function information that is preset in accordance with the word information.

This enables the voice recognition unit 60 to carry out the voice recognition according to the input voice information and the word information with increased variation, and to achieve the voice recognition while giving priority to the word corresponding to the function of the function execution key unit 23 with shorter display duration, thereby being able to increase the possibility of recognizing the voice corresponding to the function the user desires.

As described above, according to the embodiment 1, the information processor 1 is configured in such a manner as to comprise: the display unit 30 for displaying an interface screen having the function execution key unit 23 indicating a prescribed function for each function type, and the interface screen change key unit 22 for switching the interface screen for the each function type; the interface screen operating unit 40 for accepting the operation for the function execution key unit 23 or for the interface screen change key unit 22 displayed on the display unit 30; the interface screen control unit 20 for receiving the operation signal corresponding to an operation made from the interface screen operating unit 40 to the interface screen change key unit 22, and for controlling display switching of the interface screen on the display unit 30 in response to the operation signal; the interface screen operation history recording unit 110 for recording, in response to the operation signal which corresponds to the operation of the function execution key unit 23 or of the interface screen change key unit 22 and which is received from the interface screen operating unit 40, operation time of the function execution key unit 23 or of the interface screen change key unit 22 and operation contents resulting from continuous operations of the interface screen change key unit 22 at intervals not greater than the prescribed time period as continuous operation information; the likelihood value providing unit 120 for calculating and adding, to each function the function execution key unit 23 indicates, the likelihood value indicating the degree of the desire of a user in a manner that the degree of the desire increases with the reduction of the display duration by determining the display duration of the function execution key unit 23 from the continuous operation information recorded in the interface screen operation history recording unit 110; the priority recognition word setting unit 130 for storing word information for each function in advance, and for outputting the word information corresponding to the function whose likelihood value which is set by the likelihood value providing unit 120 is not less than the prescribed value; the voice recognition unit 60 for carrying out voice recognition of the input voice by referring to the word information supplied from the priority recognition word setting unit 130; and the function executing unit 70 for executing the function of the function execution key unit 23 operated via the interface screen operating unit 40 or the function corresponding to the word which passes through the voice recognition by the voice recognition unit 60. Accordingly, it can facilitate the voice recognition of the word corresponding to a function other than the functions of the function execution key units which have already been displayed in the continuous operation of the present operation. As a result, the information processor 1 offers an advantage of being able to facilitate execution of the function the user desires by the voice recognition.

In addition, according to the embodiment 1, the information processor 1 is configured in such a manner as to comprise the likelihood value providing unit 120 that compares the past continuous operation information, which is recorded in the interface screen operation history recording unit 110 and indicates the operation contents according to which the interface screen change key unit 23 is operated continuously until the function execution key unit 23 is operated, with the current continuous operation information, which indicates the operation contents according to which the interface screen change key unit 22 is continuously operated without any operation of the function execution key unit 23 up to now, and that estimates and provides the likelihood value of the function, which is executed according to the past continuous operation information having operation contents similar to the current continuous operation information, as the likelihood value to be assigned to the function corresponding to the function execution key unit 23 operated in the current operation. Accordingly, it offers an advantage of being able to estimate the function the user desires by adapting the continuous operation executed in the past.

Embodiment 2

In the embodiment 1, the configuration is described which sets the priority recognition word information for the voice recognition according to the likelihood value for each function indicating the probability (degree) the user desires. In the present embodiment 2, a configuration will be described which sets the priority recognition word information for the voice recognition by taking into account user's labor spent for searching for the function the user desires.

Figure 7:
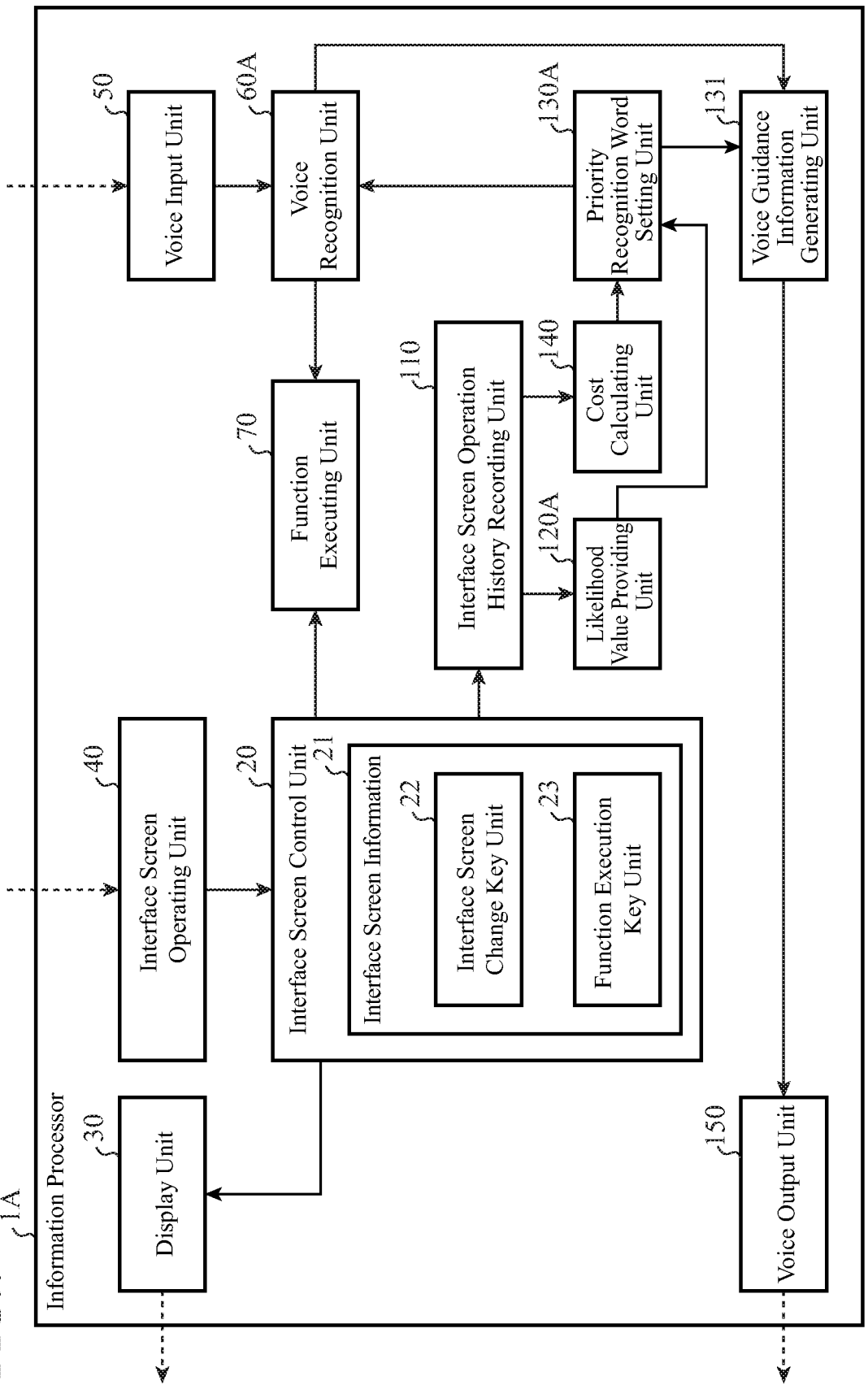
FIG. 7 is a block diagram showing a functional configuration of an information processor of an embodiment 2 in accordance with the present invention.

FIG. 7 shows a functional configuration of the information processor of the embodiment 2. The information processor 1A of the embodiment 2 comprises in addition to the configuration of the information processor 1 of the embodiment 1 a voice guidance information generating unit 131, a cost calculating unit 140 and a voice output unit 150.

As shown in FIG. 7, the information processor 1A comprises the interface screen control unit 20, display unit 30, interface screen operating unit 40, voice input unit 50, voice recognition unit 60A, function executing unit 70, interface screen operation history recording unit 110, likelihood value providing unit 120A, priority recognition word setting unit 130A, voice guidance information generating unit 131, cost calculating unit 140, and voice output unit 150.

As for the interface screen control unit 20, display unit 30, interface screen operating unit 40, voice input unit 50, function executing unit 70, interface screen operation history recording unit 110, and likelihood value providing unit 120A, since they are the same as their counterparts of the embodiment 1, their description will be omitted.

The cost calculating unit 140 is configured in such a manner that using the past continuous operation information, which indicates the contents of the continuous operations of the interface screen change key unit 22 until the function execution key unit 23 is operated and which is recorded in the interface screen operation history recording unit 110, and the current continuous operation information indicating the contents of the continuous operations of the interface screen change key unit 22 without any operation of the function execution key unit 23 up to now, it calculates a cost value indicating user's labor required before executing the function in terms of the difference between the time period during which the interface screen change key unit 22 is operated continuously in the present operation and the average of the elapsed time periods until the function execution key unit 23 is operated in the past, which are determined from a plurality of pieces of the past continuous operation information. According to the current continuous operation information and past continuous operation information recorded in the interface screen operation history recording unit 110, for example, the cost calculating unit 140 calculates as the cost value the difference between the elapsed time period in the present continuous operation (last operation time–first operation time) and the average time period of the elapsed time periods in the past continuous operations (sum total of the elapsed time periods in the continuous operations/the total number of times of the continuous operations)

Incidentally, the cost calculating unit 140 can be configured in such a manner as to calculate the cost value by another method. In that case, the cost calculating unit 140 calculates the cost value by comparing the current continuous operation information with the past continuous operation information or by selecting from among the past continuous operation information, for example. For example, the cost calculating unit 140 compares the past continuous operation information with the current continuous operation information recorded in the interface screen operation history recording unit 110, and calculates the cost value indicating the user's labor in terms of the difference between the elapsed time period of the present operation and the elapsed time period up to the operation of the function execution key unit 23 in the past continuous operation information similar to the operation contents of the present operation.

The priority recognition word setting unit 130A is configured in such manner that when the cost value fed from the cost calculating unit 140 is less than a prescribed value, it terminates the processing without carrying out the priority recognition word setting. In addition, the priority recognition word setting unit 130A is configured in such a manner that when the cost value fed from the cost calculating unit 140 is not less than the prescribed value, it carries out a release setting so as not to carry out the voice recognition of the word information corresponding to the function information with the likelihood value less than the prescribed value in accordance with the likelihood value for each of all the function information from the likelihood value providing unit 120A. Furthermore, according to the word information corresponding to the function with the highest likelihood value, the priority recognition word setting unit 130A functions so as to instruct the voice guidance information generating unit 131 to output voice guidance information that prompts a user to give utterance about the word information.

When the cost value fed from the cost calculating unit 140 is not less than the prescribed value, for example, according to all the function information and the likelihood value for each function information fed from the likelihood value providing unit 120A, the priority recognition word setting unit 130A releases the word information corresponding to the function information, to which the likelihood value less than the preset prescribed value is given, to prevent the voice recognition unit 60A from recognizing the word information. Subsequently, according to the likelihood value for each function information from the likelihood value providing unit 120A, the priority recognition word setting unit 130A supplies an instruction signal to the voice guidance information generating unit 131 to output voice guidance information that will prompt the user to give utterance about the word corresponding to the function information with the highest likelihood value.

According to the voice information input from the voice input unit 50, the voice recognition unit 60A instructs the voice guidance information generating unit 131 to output the voice guidance information for prompting the user to reenter voice if the number of times of reentering from the voice input unit 50 is less than a prescribed number of times. When the voice recognition unit 60A decides that it cannot achieve the voice recognition, for example, it confirms the number of times of reentering the voice information from the voice information input from the voice input unit 50, and decides on whether the number of times of reentering is less than a prescribed number of times or not. When the voice recognition unit 60A decides that the number of times of reentering is less than the prescribed number of times, it supplies the voice guidance information generating unit 131 with an instruction signal to output the voice guidance information prompting to reenter voice. Incidentally, when the voice recognition unit 60A decides that the number of times of reentering is not less than the prescribed number of times, it supplies the voice guidance information generating unit 131 with an instruction signal to output the voice guidance information for notifying that the voice recognition processing has an error.

The voice guidance information generating unit 131 functions so as to output the voice guidance information for prompting the user to give utterance in accordance with the instruction from the priority recognition word setting unit 130A. According to the instruction signal from the priority recognition word setting unit 130A, for example, the voice guidance information generating unit 131 creates the voice guidance information about the function designated from the voice guidance information for each function stored in advance, and supplies it to the voice output unit 150. As the voice guidance information, a plurality of interactive contents with a user such as "Do you search for an operation concerning route setting?" or "Please talk an operation content concerning route setting" have been recorded in advance.

In addition, the voice guidance information generating unit 131 functions so as to output in response to the instruction from the voice recognition unit 60A the voice guidance information prompting the user to reenter his or her voice or the voice guidance information notifying of the voice recognition error. According to the instruction signal from the voice recognition unit 60A, for example, the voice guidance information generating unit 131 creates the voice guidance information with the function that is designated from among the voice guidance information for the individual functions stored in advance, and supplies it to the voice output unit 150. In this case, as the voice guidance information, the contents such as "Please talk the operation content concerning route setting once again" which prompts the user to reenter his or her voice, or "Sorry, but unable to recognize" which notifies the user of the voice recognition error are recorded in advance.

The voice output unit 150, which consists of a speaker, for example, functions in such a manner as to output the voice guidance information from the voice guidance information generating unit 131 in sound waves.

Here, a cost value calculating method of the cost calculating unit 140 will be described.

The cost calculating unit 140 calculates the elapsed time period in the current continuous operation NOW on the interface screen as shown in the foregoing FIG. 4 according to the following Expression (1), for example.

$$S_{now} = T_{Onow,nowLast} - T_{Onow,1} \quad (1)$$

As shown in Expression (1), the elapsed time period $S_{now}$ of the current continuous operation NOW equals the value obtained by subtracting the first operation time $T_{Onow,1}$ from the last operation time $T_{Onow,nowLast}$.

Next, the cost calculating unit 140 calculates the average time period $E(S_{Pm})$ of the elapsed time periods in the past continuous operations according to the following Expression (2).

$$E(S_{Pm}) = \frac{1}{\text{Last}} \sum_{\text{Last}} \left( T_{Om,mLast} - T_{Om,1} \right) \quad (2)$$

The elapsed time period $S_{Pm}$ in a past continuous operation $P_m$ (m=1, 2, ..., Last) equals the value given by Expression (2) obtained by subtracting the first operation time $T_{Om,1}$ in the continuous operation from the operation time $T_{Om,mLast}$ of the function execution key unit 23.

As shown in Expression (2), the average time period $E(S_{Pm})$ of the elapsed time periods $S_{Pm}$ in the past continuous operations $P_m$ (m=1, 2, ..., Last) equals the value obtained by dividing the sum total of the elapsed time periods $S_{Pm}$ in the continuous operations by the total number of times of continuous operations Last (1 to Last).

After that, the cost calculating unit 140 calculates the difference between the elapsed time period $S_{now}$ in the current continuous operation calculated by Expression (1) and the average time period $E(S_{Pm})$ of the elapsed time periods in the past continuous operations calculated in Expression (2) as the cost value Cost according to the following Expression (3).

$$\text{Cost} = S_{now} - E(S_{Pm}) \quad (3)$$

Next, the processing operation of the information processor of the embodiment 2 will be described with reference to the flowchart shown in FIG. 8.

Figure 8:
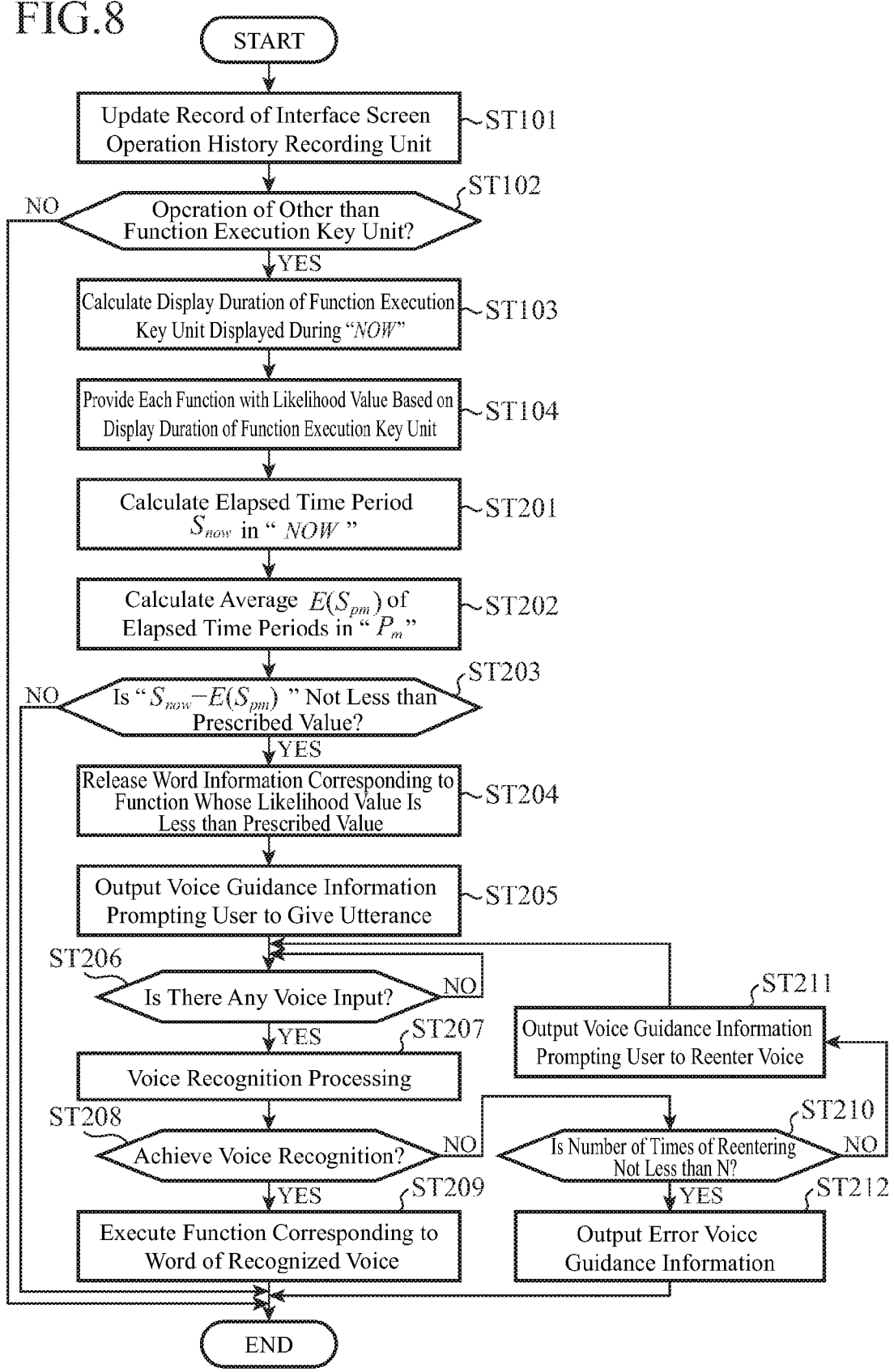
FIG. 8 is a flowchart showing the processing operation in the information processor of the embodiment 2 in accordance with the present invention.

The information processor 1A starts processing in response to the operation of the user on the interface screen fed via the interface screen operating unit 40 ("START" of FIG. 8).

In FIG. 8, since the processing steps from step ST101 to step ST104 are the same as those of the embodiment 1, the description of the processing steps will be omitted.

When the likelihood value for each function is supplied to the priority recognition word setting unit 130A at step ST104 of the likelihood value providing unit 120A, the cost calculating unit 140 calculates the elapsed time period $S_{now}$ by subtracting the first operation time $T_{Onow,1}$ from the last operation time $T_{Onow,nowLast}$ in the current continuous operation information in accordance with the current continuous operation information recorded in the interface screen operation history recording unit 110 (step ST201).

Following step ST201, the cost calculating unit 140 calculates the elapsed time period $S_{Pm}$ of the past continuous operation $P_m$ by subtracting the first operation time $T_{Om,1}$ from the operation time $T_{Om,mLast}$ of the function execution key unit 23 for each continuous operation, and the sum total of the elapsed time periods $S_{Pm\ (m=1,2,\ldots,Last)}$ of the past continuous operations $P_m$ (m=1, 2, ..., Last).

The cost calculating unit 140 calculates the average time period $E(S_{Pm})$ of the elapsed time periods $S_{Pm}$ in the past continuous operations $P_m$ (m=1, 2, ..., Last) by dividing the sum total of the elapsed time periods $S_{Pm\ (m=1,2,\ldots,Last)}$ of the past continuous operations $P_m$ (m=1, 2, ..., Last) by the total number of times of the continuous operations Last (1 to Last) (step ST202).

Following step ST202, the cost calculating unit 140 calculates the difference between the elapsed time period $S_{now}$ of the current continuous operation and the average time period $E(S_{Pm})$ of the elapsed time periods of the past continuous operations as the cost value Cost, and supplies it to the priority recognition word setting unit 130A.

The priority recognition word setting unit 130A decides on whether the cost value Cost ($=S_{now}-E(S_{Pm})$) fed from the cost calculating unit 140 is not less than the preset prescribed value or not ($S_{now}-E(S_{Pm})\geq$ prescribed value) (step ST203). When the priority recognition word setting unit 130A decides at step ST203 that the cost value Cost is less than the preset prescribed value ("NO" at step ST203), it terminates the processing without setting the priority recognition word ("END").

On the other hand, when the priority recognition word setting unit 130A decides at step ST203 that the cost value Cost is not less than the preset prescribed value ("YES" at step ST203), it sets to the voice recognition unit 60A the word information corresponding to the function information whose likelihood value is not less than the prescribed value in accordance with the likelihood value provided to the function information fed from the likelihood value providing unit 120A, but releases the setting of the word information corresponding to the function information whose likelihood value is less than the prescribed value (step ST204).

After releasing the word information corresponding to the function information whose likelihood value is less than the prescribed value, the priority recognition word setting unit 130A supplies the voice guidance information generating unit 131 with the instruction signal to output the voice guidance information for prompting the user to give utterance at step ST204.

Receiving the instruction signal following step ST204 of the priority recognition word setting unit 130A, the voice guidance information generating unit 131 creates the voice guidance information for prompting the user to give utterance, and outputs it via the voice output unit 150 (step ST205).

When the voice guidance information for prompting the user to give utterance at step ST205 of the voice guidance information generating unit 131, the voice recognition unit 60A decides on whether voice information is input via the voice input unit 50 or not (step ST206). When the voice recognition unit 60A decides at step ST206 that the voice information is not input ("NO" at step ST206), it repeats the decision at step ST206.

When the voice recognition unit 60A decides at step ST206 that the voice information is input ("YES" at step ST206), it carries out the voice recognition processing of the voice information from the voice input unit 50 (step ST207).

The voice recognition unit 60A decides at step ST207 on whether it has achieved the voice recognition or not (step ST208). When the voice recognition unit 60A decides that it has achieved the voice recognition at step ST208 ("YES" at step ST208), it supplies the function executing unit 70 with a command signal to execute the function.

According to the function information contained in the command signal from the voice recognition unit 60A, the function executing unit 70 starts the program corresponding the function information from among a plurality of programs stored in advance, and executes the function (step ST209), followed by terminating the processing ("END").

When the voice recognition unit 60A decides at step ST208 that it cannot achieve the voice recognition ("NO" at step ST208), it confirms the number of times of reentering of the voice information from the voice information input from the voice input unit 50, and decides on whether the number of times of reentering is not less than a prescribed number of times N (step ST210).

When the voice recognition unit 60A decides at step ST210 that the number of times of reentering is less than the prescribed number of times N ("NO" at step ST210), it supplies the voice guidance information generating unit 131 with an instruction signal to output the voice guidance information that prompts the user to reenter his or her voice.

Receiving the instruction signal for "NO" from the priority recognition word setting unit 130A at step ST210 of the priority recognition word setting unit 130A, the voice guidance information generating unit 131 generates the voice guidance information prompting the user to reenter his or her voice, and outputs it via the voice output unit 150 (step ST211), followed by iterating the processing operation from step ST206.

On the other hand, when the voice recognition unit 60A decides at step ST210 that the number of times of reentering is not less than the prescribed number of times N ("YES" at step ST210), it supplies the voice guidance information generating unit 131 with an instruction signal to output the voice guidance information for notifying that the voice recognition processing has an error.

Receiving the instruction signal for "YES" at step ST210 of the priority recognition word setting unit 130A, the voice guidance information generating unit 131 creates the voice guidance information notifying that the voice recognition processing has an error, and outputs it via the voice output unit 150 (step ST212), followed by terminating the processing ("END").

As described above, according to the embodiment 2, the information processor 1A is configured in such a manner as to comprise in addition to the configuration of the embodiment 1 the cost calculating unit 140 for calculating, as a cost value indicating user's labor required before executing a function, the difference between the time period in which the interface screen change key unit 22 is continuously operated in the present operation (the last operation time–first operation time) and the average (sum total of elapsed time periods in continuous operations/total number of times of continuous operations) of elapsed time periods until the function execution key unit 23 is operated in the past, which are determined from plural pieces of the past continuous operation information, by using the past continuous operation information, which is recorded in the interface screen operation history recording unit 110 and indicates the operation contents according to which the interface screen change key unit 22 is continuously operated until the function execution key unit 23 is operated, and by using the current continuous operation information, which indicates the operation contents according to which the interface screen change key unit 22 is operated continuously without any operation of the function execution key unit 23 up to now; and the priority recognition word setting unit 130 for setting, when the cost value calculated by the cost calculating unit 140 is not less than the prescribed value, the release of the word information corresponding to the function information whose likelihood value is less than a prescribed value in accordance with the likelihood values for all the individual pieces of the function information, which are set by the likelihood value providing unit 120A. Accordingly, when the labor (cost value) the user expended is great, it can decide that a desired function is not found and achieve the voice recognition after increasing variations of the word corresponding to a function with a high likelihood value. Thus, the possibility of being able to execute the desired function through the voice recognition increases as compared with conventional cases. As a result, the information processor 1A offers an advantage of being able to reduce the frequency of occurrences of giving up operation because the user cannot achieve the desired function.

In addition, according to the embodiment 2, the information processor 1A is configured in such a manner as to comprise the cost calculating unit 140 which compares the past continuous operation information with the current continuous operation information recorded in the interface screen operation history recording unit 110, and which calculates the cost value representing the user's labor in terms of the difference between the elapsed time period of the current operation and the elapsed time period until the function execution key unit 23 is operated in the past continuous operation information similar in the operation contents to the current operation. Accordingly, it offers an advantage of being able to estimate the labor the user operates by adapting the continuous operation performed in the past.

Furthermore, according to the embodiment 2, the information processor 1A is configured in such a manner as to comprise the priority recognition word setting unit 130A for instructing, when the cost value fed from the cost calculating unit 140 is not less than the prescribed value, the voice guidance information generating unit 131 to output the voice guidance information for prompting the user to give utterance of the word corresponding to the function with a high likelihood value; the voice recognition unit 60A for instructing, when the number of times of reentering fed from the voice input unit 50 is less than the prescribed number of times, the voice guidance information generating unit 131 to output the voice guidance information prompting the user to reenter his or her voice in accordance with the voice information input from the voice input unit 50; the voice guidance information generating unit 131 for creating the voice guidance information for prompting the user to give utterance in accordance with the instruction from the priority recognition word setting unit 130A or the instruction from the voice recognition unit 60A; and the voice output unit 150 for outputting the voice guidance in accordance with the voice guidance information from the voice guidance information generating unit 131. Accordingly, it can provide the information for prompting the user to give utterance by the voice guidance when the user cannot find the function execution key unit 23 he or she searches for. As a result, the information processor 1A offers an advantage of being able to reduce the frequency of occurrences of giving up the operation without achieving the function the user desires.

Embodiment 3

In the foregoing embodiment 2, a configuration is described which calculates the cost value indicating the labor the user is supposed to expend according to the elapsed time periods in the individual continuous operations. In the present embodiment 3, a configuration will be described which calculates the cost value by assigning weights to the elapsed time periods in the individual continuous operations.

Figure 9:
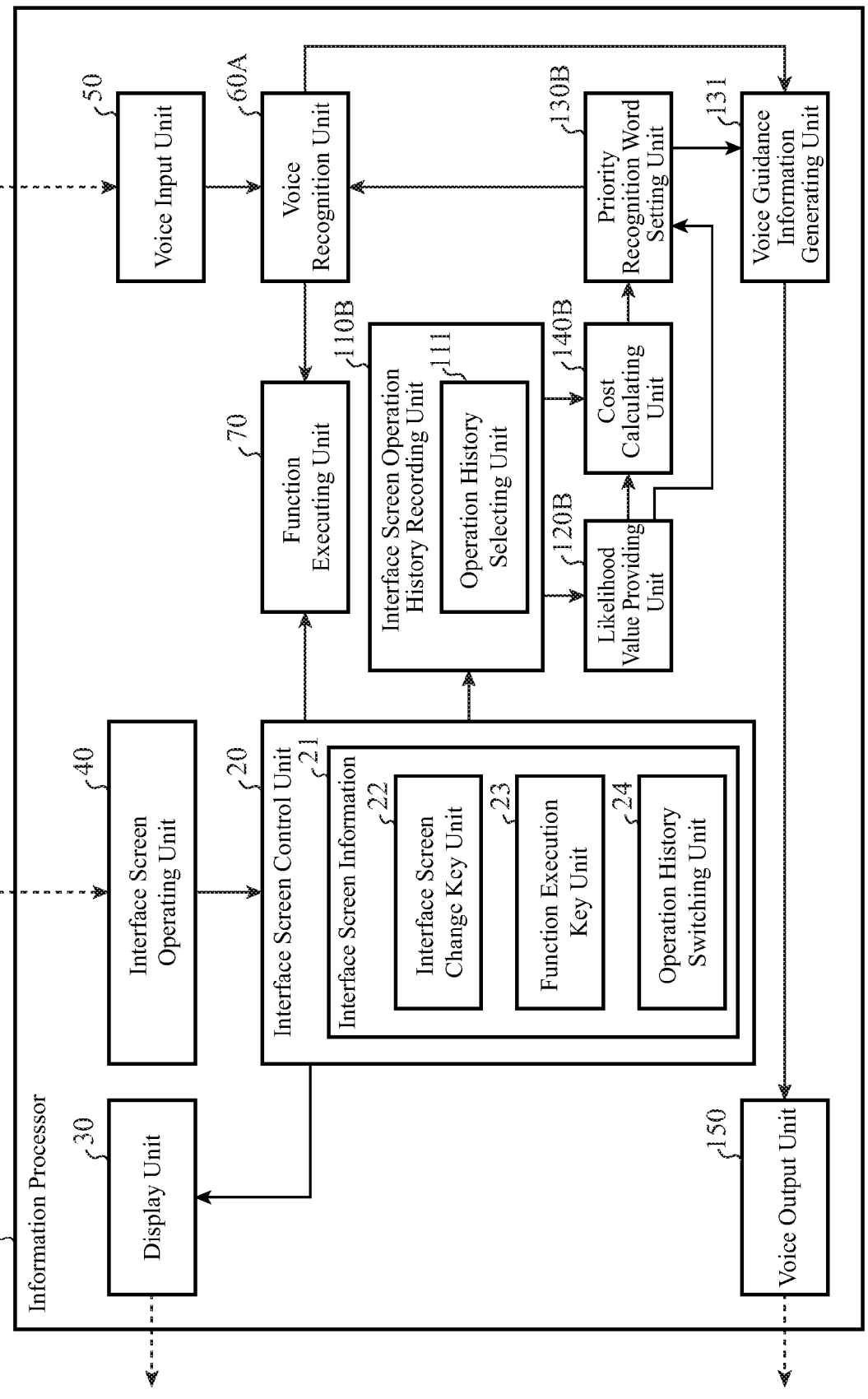
FIG. 9 is a block diagram showing a functional configuration of an information processor of an embodiment 3 in accordance with the present invention.

FIG. 9 shows a functional configuration of the information processor of the embodiment 3. The information processor 1B of the embodiment 3 comprises an operation history switching unit 24 in addition to the configuration of the information processor 1A of the embodiment 2.

As shown in FIG. 9, the information processor 1B comprises the interface screen control unit 20, display unit 30, interface screen operating unit 40, voice input unit 50, voice recognition unit 60A, function executing unit 70, likelihood value providing unit 120B, priority recognition word setting unit 130B, voice guidance information generating unit 131, cost calculating unit 140B, and voice output unit 150.

The display unit 30, interface screen operating unit 40, voice input unit 50, function executing unit 70, interface screen operation history recording unit 110, voice guidance information generating unit 131, and voice output unit 150 have the same configuration as their counterparts of the embodiment 1. Accordingly, their description will be omitted here.

The interface screen control unit 20 is configured in such a manner as to store plural pieces of interface screen information 21 which have been set in advance, and to display the interface screen information 21 via the display unit 30 as an interface screen. The interface screen information 21 has plural interface screen change key units 22 and plural function execution key units 23 and an operation history switching unit 24. The operation history switching unit 24 is an operation key for switching information (user information) for each user, which is provided to the operation information. The operation history switching unit 24, which is operated by the user via the interface screen operating unit 40, for example, is configured in such a manner as to switch to the user information designated from among the plurality of pieces of the prestored user information, and to provide the designated user information to the operation information to be output. Incidentally, as for the plural interface screen change key units 22 and the plural function execution key units 23, since they are the same as their counterparts of the embodiment 1, their description will be omitted.

In addition, according to the operation signal the user inputs via the interface screen operating unit 40, the interface screen control unit 20 functions so as to supply the interface screen operation history recording unit 110 with the operation contents and the operation information with the operation time and user information added. For example, when the user operates the interface screen change key unit 22 or function execution key unit 23 via the interface screen operating unit 40, the interface screen control unit 20 supplies the interface screen operation history recording unit 110 with the operation contents indicating the interface screen change key unit 22 or function execution key unit 23 operated, and with the operation information which contains the operation time indicating the timing of the operation and the user information added.

The interface screen operation history recording unit 110 functions in such a manner as to receive from the interface screen control unit 20 the operation content information and operation time information based on the operation signal of the function execution key unit 23 and interface screen change key unit 22 by each user on the display unit 30, and to record the continuous operation information indicating the operation contents and their operation time operated at intervals not greater than the prescribed time period by each user. The interface screen operation history recording unit 110 records such operation information and continuous operation information from the time of shipment up to the present or from the start of the information processor up to now.

The interface screen operation history recording unit 110 comprises an operation history selecting unit 111. The operation history selecting unit 111 functions in such a manner as to select and output the continuous operation information of the user, which is selected from the continuous operation information for each user by the operation history switching unit 24. For example, the operation history selecting unit 111 stores the user information designated by a user via the operation history switching unit 24, selects from the continuous operation information for the individual users the continuous operation information of the user corresponding to the user information fed from the operation history switching unit 24, and supplies it to the likelihood value providing unit 120B and cost calculating unit 140B.

According to the degree of agreement between the selection pattern information about the operation contents selected in the current continuous operation and the selection pattern information about the operation contents selected in the past continuous operations, the likelihood value providing unit 120B functions in such a manner as to determine for each user the likelihood value indicating the probability (degree) for each function to be the function the user wants to be executed at present.

For example, according to the current continuous operation information and the past continuous operation information recorded in the interface screen operation history recording unit 110, the likelihood value providing unit 120B extracts the selection pattern information about the operation contents in the current continuous operation and the selection pattern information about the operation contents in the past continuous operation. The likelihood value providing unit 120B calculates the degree of agreement between the selection pattern information about the operation contents in the current continuous operation and the selection pattern information about the operation contents in the past continuous operation, and outputs the function information to which the degree of agreement is provided as the likelihood value of the function operated in the past continuous operation. A calculating method of the likelihood value will be described later.

The cost calculating unit 140B is configured in such a manner as to assign the likelihood value, which is set to the function of the function execution key unit 23, as a weight to the elapsed time period until the function execution key unit 23 is operated, which is determined from the past continuous operation information, and to calculate the difference between the time period during which the interface screen change key unit 22 is continuously operated in the present operation and the average time of the elapsed time periods which are derived from the plural pieces of the past continuous operation information and are assigned the weights as the cost value indicating the user's labor required until executing the function.

The cost calculating unit 140B calculates the elapsed time period (the last operation time–first operation time) in the current continuous operation from the current continuous operation information, for example. In addition, according to the past continuous operation information and the likelihood values, the cost calculating unit 140B calculates the average time period of the elapsed time periods in the past continuous operations, to which weights are assigned by multiplying the likelihood values (sum total of (likelihood value×elapsed time period in each continuous operation)/the total number of times of continuous operations). The cost calculating unit 140B calculates as the cost value the difference between the elapsed time period in the current continuous operation and the average time period of the elapsed time periods in the past continuous operations to which the weights are assigned by multiplying the likelihood values.

When the cost value from the cost calculating unit 140B is not less than the prescribed value, the priority recognition word setting unit 130B functions in such a manner as to set the word information corresponding to the individual functions in accordance with the likelihood values for the individual functions from the likelihood value providing unit 120B. For example, when the cost value from the cost calculating unit 140B is not less than a prescribed value zero, the priority recognition word setting unit 130B sets an increased number of pieces of the word information corresponding to the functions whose likelihood values are not less than the prescribed value in accordance with the likelihood values for the individual functions from the likelihood value providing unit 120B, and releases the word information corresponding to a functions whose likelihood value is less than the prescribed value.

Here, a likelihood value calculating method of the likelihood value providing unit 120B of the embodiment 3 will be described.

According to the continuous operation information recorded in the interface screen operation history recording unit 110, the likelihood value providing unit 120B extracts the selection pattern information $V_{now}=(O_{now,1}, O_{now,2}, \ldots, O_{now,nowLast})$ about the operation contents in the current continuous operation NOW shown in FIG. 4 described above, and the selection pattern information $V_{Pm}=(O_{m,1}, O_{m,2}, \ldots, O_{m,mLast})$ about the operation contents in the past continuous operation $P_m$, for example, and calculates the degree of agreement between the selection pattern information $V_{now}$ and the selection pattern information $V_{Pm}$. The likelihood value providing unit 120B outputs together with the function information the degree of agreement calculated as the likelihood value Wx of the function X executed in the continuous operation $P_m$. Incidentally, when the function X is executed by a plurality number of times in the past continuous operation $P_m$, the likelihood value providing unit 120B assigns the maximum value of the plural degrees of agreement to the likelihood value Wx.

As for the degree of agreement, it is set to be decided by some reference such as the following (1) and (2), for example.

(1) It is set in such a manner that functions have a higher degree of agreement when their operation contents of the interface change key unit 22 agree with each other.

(2) It is set in such a manner that functions have a higher degree of agreement when their display contents on the interface screen agree with each other.

Incidentally, as for a function without the past continuous operation $P_m$, its likelihood value is made zero because the likelihood value of the function is determined from the degree of agreement with the past continuous operation $P_m$.

A calculation example of setting a higher degree of agreement to functions in which the operation contents of the interface change key unit 22 agree more closely will be described below.

(Calculation Example of Degree of Agreement Between Operation Contents of Interface Change Key Unit 22)

The likelihood value providing unit 120B calculates the following degree of operation similarity $R_{mj}$ that takes a smaller value as the difference in the number of times of operations between the past continuous operation $P_m$ and the current continuous operation increases for each of the operations $f_1$ to $f_n$ (j=1, ..., n) prepared as the interface change key units 22.

$R_{mj}=1/(1+|[\text{number of times of operations in past continuous operation } P_m]-[\text{number of times of operations in current continuous operation}]|)$ For each past continuous operation $P_m$, the likelihood value providing unit 120B calculates the sum of the degrees of operation similarity $R_{mj}$ for the operations $f_1$ to $f_n$ as the degree of operation agreement $S_m$. It assigns the degree of operation agreement $S_m$ as the likelihood value of the function executed in the past continuous operation $P_m$.

A calculation example of setting a higher degree of agreement to functions in which the display contents of the interface screen agree more closely will be described below.

(Calculation Example of Degree of Agreement between Display Contents on Interface Screen)

The likelihood value providing unit 120B calculates the following degree of display similarity $H_{mj}$ that takes a smaller value as the difference in the presence or absence of display between the past continuous operation $P_m$ and the current continuous operation increases for each of the screens $I_1$ to $I_n$ (j=1, ..., n) prepared as the interface screen.

$H_{mj}=1$: When displayed in both the past continuous operation $P_m$ and the current continuous operation.

$H_{mj}=1$: When not displayed in both the past continuous operation $P_m$ and the current continuous operation.

$H_{mj}=0$: When displayed in either the past continuous operation $P_m$ or the current continuous operation.

For each past continuous operation $P_m$, the likelihood value providing unit 120B calculates the sum of the degrees of display similarity $H_{mj}$ for the screens $I_1$ to $I_n$ as the degree of display agreement $K_m$. It assigns the degree of display agreement $K_m$ as the likelihood value of the function executed in the past continuous operation $P_m$.

Thus calculating the likelihood value enables preferential voice recognition of the word information corresponding to the function executed in the past selection pattern with a high degree of agreement. Incidentally, the likelihood value providing unit 120B of the embodiment 3 can be configured so as to calculate the likelihood value in the same manner as in the embodiment 1 or 2.

Here, a cost value calculating method of the cost calculating unit 140B in the embodiment 3 will be described.

The cost calculating unit 140B calculates the elapsed time period $S_{now}$ in the current continuous operation NOW according to Expression (1) shown in the embodiment 1.

Subsequently, the cost calculating unit 140B calculates the average time period $E(Wx*S_{Pm})$ of the elapsed time periods in the past continuous operation according to the following Expression (4).

$$E(w_X * S_{Pm}) = \frac{1}{\text{Last}} \sum_{Last} w_X (T_{o_{m,mLast}} - T_{o_{m,1}}) \quad (4)$$

As shown in Expression (4), the average time period E ($W_x*S_{Pm}$) of the elapsed time periods in the past continuous operation is a value obtained by multiplying the elapsed time period $S_{Pm}$ in the continuous operation $P_m$ by the likelihood value $W_x$ of the function X executed in each continuous operation $P_m$.

The cost calculating unit 140B calculates the difference between the elapsed time period $S_{now}$ in the current continuous operation calculated by Expression (1) and the average time period $E(W_x*S_{Pm})$ of the elapsed time periods in the past continuous operations calculated by Expression (4) according to the following Expression (5) as the cost value Cost.

$$\text{Cost} = S_{now} - E(W_x * S_{Pm}) \quad (5)$$

Figure 10:
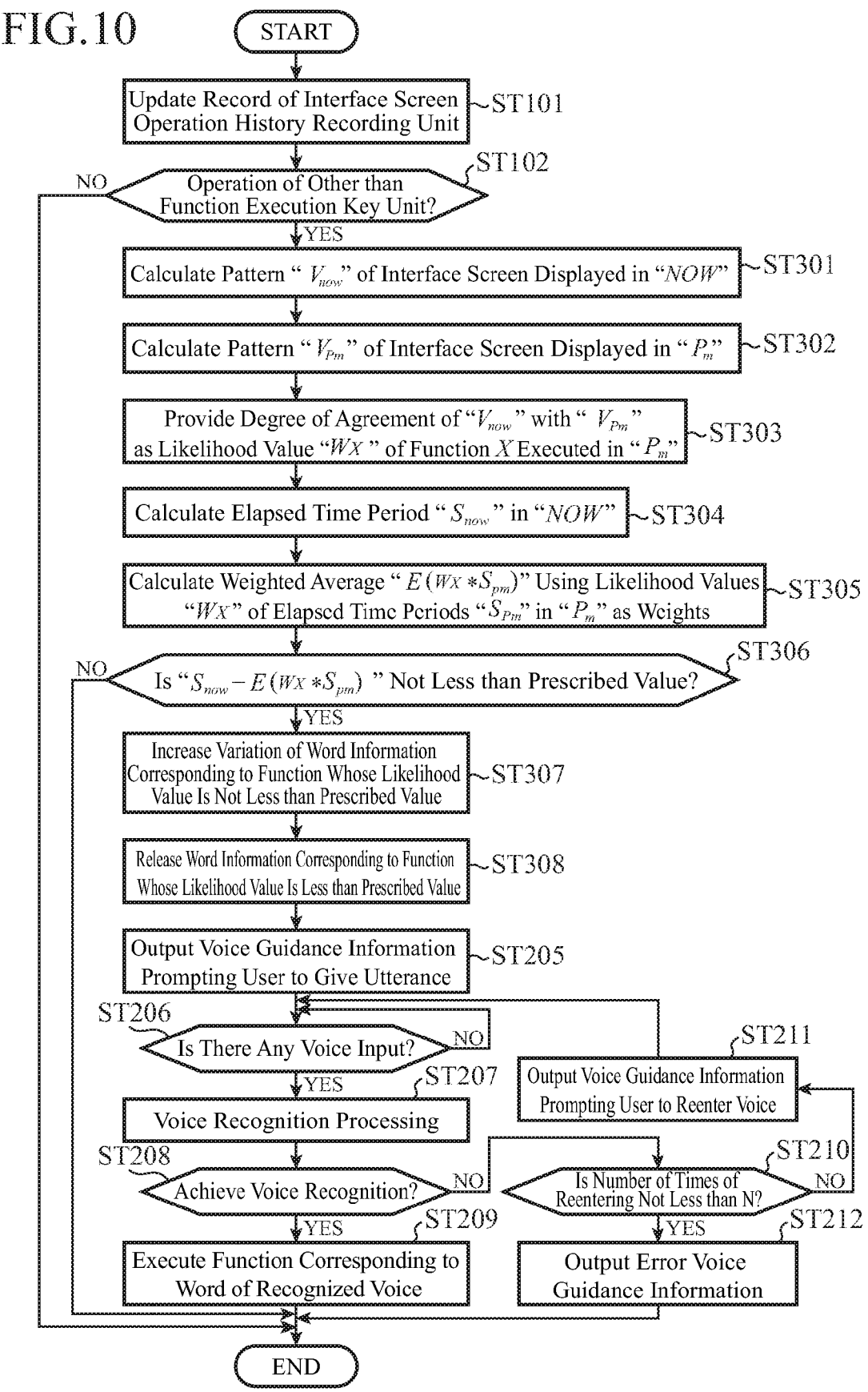
FIG. 10 is a flowchart showing the processing operation of the information processor of the embodiment 3 in accordance with the present invention.

Next, the processing operation of the information processor of the embodiment 3 will be described with reference to the flowchart shown in FIG. 10.

The information processor 1B starts its processing in response to a user operation on the interface screen performed via the interface screen operating unit 40 ("START" of FIG. 8).

The interface screen control unit 20 displays the operation history switching unit 24 for switching the user information on the interface screen and displays a prompt requesting a user operation. Receiving the operation of the operation history switching unit 24 from the user via the interface screen operating unit 40, the interface screen control unit 20 selects the user information designated from plural pieces of user information set in advance.

Subsequently, when the interface screen change key unit 22 or function execution key unit 23 is operated by the user via the interface screen operating unit 40, the interface screen control unit 20 adds the user information to the operation information offering the operation contents indicating the interface screen change key unit 22 or function execution key unit 23 operated and the operation time indicating the operated timing, and supplies to the interface screen operation history recording unit 110.

According to the operation information on each user input from the interface screen control unit 20, the interface screen operation history recording unit 110 adds or updates the operation contents and their operation time carried out continuously at intervals not greater than the prescribed time period until the function execution key unit 23 is operated, and records them as the current continuous operation information (step ST101).

After updating and recording the current continuous operation information at step ST101, the interface screen operation history recording unit 110 decides on whether the operation content of the input operation information is the operation of the function execution key unit 23 or the operation of other than the function execution key unit 23 (step ST102).

When the interface screen operation history recording unit 110 decides at step ST102 that the function execution key unit 23 is operated ("NO" at step ST102), it records the operation contents and their operation time carried out continuously at intervals not greater than the prescribed time period until the function execution key unit 23 is operated as the continuous operation information, and halts the processing until the input of the next operation information ("END").

On the other hand, when the interface screen operation history recording unit 110 decides at step ST102 that other than the function execution key unit 23 is operated ("YES" at step ST102), it updates or adds the operation contents and their operation time carried out continuously at intervals not greater than the prescribed time period, records them as the current continuous operation information, and supplies the current continuous operation information and past continuous operation information to the likelihood value providing unit 120B.

Receiving the current continuous operation information and the past continuous operation information from the interface screen operation history recording unit 110, the likelihood value providing unit 120B extracts the selection pattern information $V_{now}$ about the operation contents in the current continuous operation NOW according to the current continuous operation information (step ST301).

Following the foregoing step ST301, the likelihood value providing unit 120B extracts the selection pattern information $V_{Pm(m=1, 2, \ldots, Last)}$ about the operation contents for each past continuous operation $P_m$ (m=1, 2, . . . , Last) according to the past continuous operation information (step ST302).

The likelihood value providing unit 120B calculates the degree of agreement between the selection pattern information $V_{now}$ extracted at step ST301 and the selection pattern information $V_{Pm}$ extracted at step ST302, adds the degree of agreement calculated to the function information as the likelihood value $W_x$ of the function X executed in the continuous operation $P_m$, and supplies it to the cost calculating unit 140B and priority recognition word setting unit 130B (step ST303).

When the likelihood value $W_x$ for each function is supplied to the priority recognition word setting unit 130B at step ST303 of the likelihood value providing unit 120B, the cost calculating unit 140B calculates the elapsed time period $S_{now}$ in the current continuous operation by subtracting the first operation time $T_{Onow, 1}$ from the last operation time $T_{Onow, nowLast}$ in the current continuous operation according to the current continuous operation information recorded in the interface screen operation history recording unit 110 (step ST304).

Following step ST304, the cost calculating unit 140B calculates the elapsed time period $S_{Pm(m=1, 2, \ldots, Last)}$ for each past continuous operation $P_m$ (m=1, 2, . . . , Last) by subtracting the first operation time $T_{Om, 1}$ from the operation time $T_{Om,mLast}$ of the function execution key unit 23 for each continuous operation.

The cost calculating unit 140B assigns weights by multiplying the elapsed time periods $S_{Pm (m=1, 2, \ldots, Last)}$ of the past continuous operation $P_m$ (m=1, 2, . . . , Last) by the likelihood values $W_x$ from the likelihood value providing unit 120B, divides the sum total of the weighted elapsed time periods ($WX*S_{Pm(m=1, 2, \ldots, Last)}$) of the individual past continuous operations $P_m$ (m=1, 2, . . . , Last) by the total number of times Last (1 to Last) of the continuous operations, thereby calculating the weighted average time period E ($W_x*S_{Pm}$) of the weighted elapsed time periods $S_{Pm}$ of the individual past continuous operations $P_m$ (m=1, 2, . . . , Last) (step ST305).

The cost calculating unit 140B supplies the priority recognition word setting unit 130B with the difference between the elapsed time period $S_{now}$ of the current continuous operation calculated at step ST304 and the weighted average time period E ($W_x*S_{Pm}$) calculated at step ST305 as the cost value Cost.

The priority recognition word setting unit 130B decides on whether the cost value Cost ($=S_{now}-E(W_x*S_{Pm})$) from the cost calculating unit 140B is not less than the preset prescribed value or not ($S_{now}-E(W_x*S_{Pm}) \geq$prescribed value)

(step ST306). Here, on the assumption that the prescribed value is set at zero, it decides on whether the elapsed time period $S_{now}$ in the current continuous operation is not less than the weighted average time period E (Wx*$S_{Pm}$).

When the priority recognition word setting unit 130B decides at step ST306 that the cost value Cost is less than the preset prescribed value zero ("NO" at step ST306), it terminates the processing without setting the priority recognition word ("END").

On the other hand, when the priority recognition word setting unit 130B decides at step ST306 that the cost value Cost is not less than the preset prescribed value zero ("YES" at step ST306), it sets the word information corresponding to the function information, to which the likelihood value Wx not less than the prescribed value is assigned, to the voice recognition unit 60A to increase variations of voice recognizable voice (step ST307).

Following step ST307, the priority recognition word setting unit 130B releases the setting to the voice recognition unit 60A of the word information corresponding to the function information, to which the likelihood value Wx less than the prescribed value is assigned, and reduces the variation of the voice recognizable voice (step ST308).

When the priority recognition word setting unit 130B has released the word information corresponding to the function information whose likelihood value is less than the prescribed value at step ST308, it supplies the voice guidance information generating unit 131 with the instruction signal to output the voice guidance information for prompting the user to give utterance.

Following step ST308, the information processor 1B of the embodiment 3 executes the processing at step ST205 and forward of the embodiment 2. Since the processing operation at step ST205 and on is the same as that of the embodiment 2, description thereof will be omitted.

As described above, according to the embodiment 3, the information processor 1B is configured in such a manner as to comprise: the cost calculating unit 140 for weighting the elapsed time periods until the function execution key unit 23 is operated, which are determined from the past continuous operation information, by the likelihood values which are set to the functions of the function execution key unit 23, and for calculating, as the cost value indicating user's labor required before executing the function, the difference between the time period in which the interface screen change key unit 22 is continuously operated in the present operation and the average of the elapsed time periods which are derived from the plurality of pieces of the past continuous operation information and pass through the weighting; and the priority recognition word setting unit 130B for setting, when the cost value from the cost calculating unit 140B is not less than the prescribed value, the word information corresponding to each function in accordance with the likelihood value for each function from the likelihood value providing unit 120B. Accordingly, it can decide on whether the user takes a long time for the operation or not by considering the degree of the desire of the user for each function. As a result, it offers an advantage of being able to improve the calculation accuracy of the cost value in the information processor 1B.

In addition, according to the embodiment 3, the information processor 1B is configured in such a manner as to comprise: the interface screen control unit 20 for adding the user information to the operation information indicating the operation contents and operation time according to the operation signal input by the user via the interface screen operating unit 40 and supplies to the interface screen operation history recording unit 110; and the interface screen operation history recording unit 110 that records, in response to the operation signal of each user corresponding to the operation to the function execution key unit 23 or the interface screen change key unit 22 input from the interface screen operating unit 40, the operation time of the function execution key unit 23 or of the interface screen change key unit 22 and the operation contents according to which the interface screen change key unit 22 is continuously operated at intervals not greater than the prescribed time period as the continuous operation information for each user, and that includes the operation history selecting unit 111 for selecting and outputting for each user the continuous operation information which is recorded in the interface screen operation history recording unit 110. Accordingly, it can use separate continuous operation information for each user. As a result, it offers an advantage of enabling the information processor 1B to execute the function each user desires more easily by the voice recognition.

INDUSTRIAL APPLICABILITY

According to the present invention, the information processor can facilitate executing the function the user desires by the voice recognition. As a result, it is applicable to an information processor such as a navigation system.

What is claimed is:
1. An information processor comprising:
a display unit for displaying an interface screen having a function execution key unit indicating a prescribed function for each function type, and an interface screen change key unit for switching the interface screen for the each function type;
an interface screen operating unit for accepting an operation for the function execution key unit or for the interface screen change key unit displayed on the display unit;
an interface screen control unit for receiving an operation signal corresponding to an operation made from the interface screen operating unit to the interface screen change key unit, and for controlling display switching of the interface screen on the display unit in response to the operation signal;
an interface screen operation history recording unit for recording, in response to the operation signal which corresponds to the operation of the function execution key unit or of the interface screen change key unit and which is received from the interface screen operating unit, operation time of the function execution key unit or of the interface screen change key unit and operation contents resulting from continuous operations of the interface screen change key unit at intervals not greater than the prescribed time period as continuous operation information;
a likelihood value providing unit for calculating and adding, to each function the function execution key unit indicates, a likelihood value indicating a degree of a desire of a user in accordance with the continuous operation information recorded in the interface screen operation history recording unit;
a priority recognition word setting unit for storing word information for each function in advance, and for outputting the word information corresponding to the function whose likelihood value which is set by the likelihood value providing unit is not less than a prescribed value;

a voice recognition unit for carrying out voice recognition of an input voice by referring to the word information supplied from the priority recognition word setting unit; and a function executing unit for executing the function of the function execution key unit operated via the interface screen operating unit or the function corresponding to the word which passes through the voice recognition by the voice recognition unit.

2. The information processor according to claim 1, wherein the likelihood value providing unit determines display duration of the function execution key unit from current continuous operation information indicating operation contents according to which the interface screen change key unit is continuously operated without any operation of the function execution key unit up to now, and for calculating and adding, to each function the function execution key unit indicates, the likelihood value in a manner that the degree of the desire increases as the display duration reduces.

3. The information processor according to claim 1, wherein the priority recognition word setting unit sets the word information corresponding to the function whose likelihood value, which is set by likelihood value providing unit, is not less than the prescribed value in a manner that the word information is subjected to the voice recognition preferentially.

4. The information processor according to claim 1, wherein the interface screen operation history recording unit, which records past continuous operation information indicating operation contents according to which the interface screen change key unit is operated continuously until the function execution key unit is operated, records in the past continuous operation information the likelihood value of the function executed; and the likelihood value providing unit compares the past continuous operation information with current continuous operation information indicating operation contents according to which the interface screen change key unit is continuously operated without any operation of the function execution key unit up to now, and provides the likelihood value of a function, which is executed according to the past continuous operation information having operation contents similar to the current continuous operation information, as the likelihood value to the function corresponding to the function execution key unit operated in a current operation.

5. The information processor according to claim 1, wherein the likelihood value providing unit compares the past continuous operation information with current continuous operation information indicating operation contents according to which the interface screen change key unit is continuously operated without any operation of the function execution key unit up to now, and provides as the likelihood value a degree of agreement between the current continuous operation information and the past continuous operation information when the function execution key unit is operated in the present operation which corresponds to the function executed by the past continuous operation information.

6. The information processor according to claim 1, further comprising:

a cost calculating unit for calculating, as a cost value indicating user's labor required before executing a function, a difference between a time period in which the interface screen change key unit is continuously operated in the present operation and an average of elapsed time periods until the function execution key unit is operated in the past, which are determined from plural pieces of the past continuous operation information, by using the past continuous operation information which is recorded in the interface screen operation history recording unit and indicates the operation contents according to which the interface screen change key unit is continuously operated until the function execution key unit is operated and by using the current continuous operation information indicating operation contents according to which the interface screen change key unit is operated continuously without any operation of the function execution key unit up to now, wherein the priority recognition word setting unit, when the cost value calculated by the cost calculating unit is not less than the prescribed value, sets release so as to prevent the voice recognition of the word information corresponding to the function whose likelihood value, which is set by the likelihood value providing unit, is less than a prescribed value.

7. The information processor according to claim 6, wherein the cost calculating unit calculates the cost value by using the past continuous operation information similar in the operation contents to the current continuous operation information.

8. The information processor according to claim 6, wherein the cost calculating unit weights the elapsed time periods until the function execution key unit is operated, which are determined from the past continuous operation information, by the likelihood values which are set to the functions of the function execution key unit, and calculates, as the cost value indicating user's labor required before executing the function, a difference between the time period in which the interface screen change key unit is continuously operated in the present operation and an average of the elapsed time periods which are derived from the plurality of pieces of the past continuous operation information and pass through the weighting.

9. The information processor according to claim 1, wherein the interface screen operation history recording unit records, in response to the operation signal of each user corresponding to the operation on the function execution key unit or the interface screen change key unit input from the interface screen operating unit, the operation time of the function execution key unit or of the interface screen change key unit and the operation contents according to which the interface screen change key unit is continuously operated at intervals not greater than the prescribed time period as the continuous operation information for each user, and the information processor further comprising:

an operation history selecting unit for selecting and outputting for each user the continuous operation information which is recorded in the interface screen operation history recording unit.

10. The information processor according to claim 6, further comprising:

a voice guidance information generating unit for outputting voice guidance for prompting a user to give utterance when the cost value fed from the cost calculating unit is not less than a prescribed value.

* * * * *